United States Patent [19]
Ohmi et al.

[11] Patent Number: 5,009,963
[45] Date of Patent: Apr. 23, 1991

[54] METAL MATERIAL WITH FILM PASSIVATED BY FLUORINATION AND APPARATUS COMPOSED OF THE METAL MATERIAL

[76] Inventors: Tadahiro Ohmi, 2-1-17-302, Komegafukuro, Sendai-shi, Miyagi-ken; Masahiro Miki, 23-14-521, Tezukayama 1-Chome, Abeno-ku, Osaka; Hirohisa Kikuyama, 7-13, 3-Cho, Ayameike Kita, Nara-shi, Nara-ken; Matagoro Maeno, 2-42-6, Komyodai, Izumi-shi, Osaka, all of Japan

[21] Appl. No.: 381,914

[22] Filed: Jul. 19, 1989

[30] Foreign Application Priority Data

Jul. 20, 1988 [JP] Japan ................................ 63-181225
Jan. 13, 1989 [JP] Japan ..................................... 1-6892

[51] Int. Cl.$^5$ ............................................. C23F 20/06
[52] U.S. Cl. ................... 428/472.2; 428/469; 428/472.1; 148/283; 118/726

[58] Field of Search ............. 148/283; 428/469, 472.2, 428/472.1

[56] References Cited

U.S. PATENT DOCUMENTS 2,092,033  9/1937  Stroup ................................. 148/283
4,484,954 11/1984  Tarancon ........................... 148/283

FOREIGN PATENT DOCUMENTS 0082860  6/1971  German Democratic Rep. ..................... 148/283

Primary Examiner—Sam Silverberg
Attorney, Agent, or Firm—Armstrong, Nikaido, Marmelstein, Kubovcik & Murray

[57] ABSTRACT

A metal material characterized in that a film passivated by fluorination which is mainly composed of a metal fluoride substantially satisfying stoichiometric ratio is formed at least partially on a surface of a metal of the metal material, and an apparatus at least partially composed of the metal material.

6 Claims, 12 Drawing Sheets

METAL MATERIAL WITH FILM PASSIVATED BY FLUORINATION AND APPARATUS COMPOSED OF THE METAL MATERIAL

BACKGROUND OF THE INVENTION

1. Field of the Invention:

The present invention relates to a metal material and an apparatus composed of such metal material, and more particularly to a metal material whose corrosion resistance is significantly improved and an apparatus employing such an improved metal material, both being very useful in the field of art using high purity gas.

2. Description of Prior Arts:

Generally, in the process of manufacturing semiconductors, specific gases of high reactivity and corrosivity such as $BCl_3$, $SiF_4$, $WF_6$, etc. are used, and therefore hydrolysis occurs under the atmosphere of moisture, resulting in generation of highly corrosive acid such as hydrogen chloride, hydrogen fluoride or the like. Accordingly, when incorporating some metal material in storage container, pipe line, reaction chamber, etc. for treating the gases mentioned above, there unavoidably arises a serious problem of easy corrosion.

Recently, semiconductor devices have been small-sized to improve their integration, and various researches and developments have been made so that semiconductor devices small-sized to 1 $\mu$m to submicron or smaller than 0.5 $\mu$m may be put into practical use.

With improvement of integration, it is fatally important for semiconductors to be manufactured in the process which is kept at low temperature and with high selectivity in terms of material of substrate, thus a highly purified process atmosphere being essential. Even in the event of slight corrosion of an apparatus which needs such a highly purified process atmosphere, impurities produced as a result of such corrosion may be mixed with wafer bringing about deterioration of quality of film or membrane and making it impossible to achieve accuracy by fine processing, which eventually results in fatal loss of reliability essential for ultra-fine semiconductor devices, i.g., ULSI. For that reason, prevention of metal surface from corrosion is absolutely important. Notwithstanding, in the prior arts, countermeasure against corrosion of internal part of a gas supply unit have been very poor, allowing secondary pollution to occur due to strong reaction of particular halogen gas used, thereby desirable ultra-high purification of gas has not been able to achieve, inhibiting technological progress in the field of art.

Also in the field of excimer laser, because of corrosion of laser generator thereby inhibiting long time of use, practical use thereof has been still delayed.

In the apparatus for treating particular halogen gas such as RIE, CVD and/or the cylinder, pipe line, etc. to which no passivation treatment is applied, the following reactions take place between the gas applied and moisture adsorbed into the metal surface or oxide film thereof, and a gas by-produced by the reactions bring about secondary pollution furthermore:

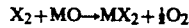

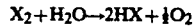

(where: M means metal, and X means halogen)

It is known that BF gas is decomposed as a result of reaction with moisture in the following manner:

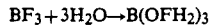

Accordingly, for filling a cylinder with BF gas, filling and withdrawal of the BF, gas are usually repeated several times just for the purpose of cleaning the internal part of the cylinder.

In this connection, the products by-produced as a result of the reactions mentioned above were acknowledged by infra-red absorption spectrum analysis method of a particular halogen gas which adsorbs moisture after filling a cylinder with the gas otherwise after passing the gas through a pipe line which adsorbed moisture.

In view of the foregoings, several attempts have been heretofore proposed to apply a corrosion resistant treatment to metal surface, among which known studies of fluorination treatment applied to metal surface are as follows:

(1) Reaction between fluorine and nickel surface as is described in ANL-5924, page 42 (1958);

(2) Reaction between fluorine and nickel surface as is described in ANL-6477, page 122 (1961);

(3) Reaction between fluorine and nickel surface as is described in J. Electrochem. Soc. Vol. 110, page 346 (1963);

(4) Method for forming a passivated film on an apparatus by fluoridation at normal temperature as is described in Matheson Gas Date Book, page 211 (1961);

(5) Study on corrosion of metal in the liquefied fluorine when fluorinating a nickel alloy at normal temperature as is described in Ind. Eng. Chem, Vol. 57, page 47 (1965);

(6) Study on reaction rate between iron and fluorine as is described in J. Electrochem. Soc., Vol. 114, page 218 (1967);

(7) Reaction of passivated film between nickel or copper alloy and fluorine as is described in Trans. Met. Soc. AIME, Vol. 242, page 1635 (1968);

(8) Study on fluorination of copper and iron as is described in Oxid. Metals., Vol. 2, page 319 (1970);

(9) Reaction speed of fluorination of iron possessing an electropolished surface; and the like.

Described hereunder is inventor's comment on the known studies mentioned above.

In the studies (1), (2) and (3), the reactivity of nickel is described, and there is no description about corrosion resistance of the films produced. In the studies (4) and (5), only fluorination at normal temperature without positive formation of film is described, and there is no detailed description about corrosion resistance. In the study (6), reaction mechanism of iron is described. In the study (7), though corrosion resistance of the formed passivated film is described, the temperature as a condition for film formation and that of test on corrosion resistance are both 27° C., which is rather low, and the film formed thereby is excessively thin and not suitable for practical use. In the studies (8) and (9), though fluorination conditions of iron and copper are described showing that corrosion resistance of iron is satisfactory at 200° C., only critical temperature of peeling in the process of film formation is evaluated, and there is no evaluation on corrosion resistance to corrosive gas.

In effect, only reactions of fluorine are described in the studies mentioned above, and there is no study aiming at practical formation of film passivated by fluorination. Thus, formation of film passivated by fluorination which is sufficiently corrosion-resistant under severe conditions has been increasingly demanded.

An object of the present invention is, therefore, to provide a metal material which is capable of preventing high purity gas from lowering its purity and has sufficient corrosion resistance to corrosive gas such as particular halogen gas by forming a passivated film on metal surface by fluorination.

Another object of the invention is to provide an apparatus composed of a metal material whose surface is passivated by fluorination as mentioned above.

The foregoing objects are accomplished by forming a film passivated by fluorination mainly composed of metal fluoride at least partially on the surface of a metal, and by incorporating the metal with such passivated film in an apparatus at least as a part thereof.

As a result of research and development with respect to corrosion of metal surface, the inventors have found that a film passivated by fluorination which has a characteristic of desirable corrosion resistance to corrosive gas can be formed by the steps of baking at least one of such metals as stainless steel, nickel, nickel alloy, aluminum, aluminum alloy, copper, copper alloy and chromium, causing fluorine to act on the metal surface at a temperature sufficient for positive fluorination thereby forming a passivated film mainly composed of metal fluoride, and heat-treating the passivated film.

More specifically, the film passivated by fluorination is formed by the steps of baking a metal whose surface is smoothed or polished like a mirror; heating the metal to a temperature sufficient for fluorination; causing either simple substance of fluorine or fluorine diluted with such inert gas as $N_2$, Ar, He, etc. to act on the metal thereby forming a passivated film of not less than 200 Å in thickness which is mainly composed of a metal fluoride having a desirable adherence to metal and hard to be peeled; and heat-treating the passivated film under inert gas. It is to be noted that the film formed in this manner exhibits very high corrosion resistance to corrosive gas.

The invention essentially consists in formation of a film passivated by fluorination on the surface of at least one of such metals as stainless steel, nickel, nickel alloy, aluminum, aluminum alloy, copper, copper alloy and chromium, and incorporation of such metal with passivated film in components of a gas treating apparatus at least as a part thereof.

Any of known metal in the form of a simple substance including stainless steel, nickel, nickel alloy, aluminum, aluminum alloy, copper, copper alloy and chromium, and other material serving as a substrate on the surface of which a film of any of the foregoing metals is formed by plating, vacuum deposition, sputtering or any other suitable process, can be generally used as the aforesaid stainless steel, nickel, nickel alloy, aluminum, aluminum alloy, copper, copper alloy and chromium of the invention. As for the stainless steel of the invention, any of known stainless steel can be also generally used. A stainless steel composed of 15 to 28 wt % of chromium, 3.5 to 15 wt % of nickel and remaining wt % of iron and which further contains 2 to 6 wt % of other components is preferably used in the invention, for example. As for the nickel alloy, aluminum alloy and copper alloy of the invention, any of the conventional ones can be widely used on condition that not less than 50 wt % of nickel, aluminum or copper is contained therein.

As described above, in the invention, any of the enumerated metal material is baked under the inert gas, then fluorinated to form a passivated film composed of metal fluoride on every surface otherwise at least on a part of the surface of the metal material, and the metal material with passivated film is further heat-treated under the atmosphere of inert gas.

The baking temperature for nickel, nickel alloy, copper, copper alloy and chromium is in the range of 350° to 600° C., preferably in the range of 400° to 500° C. The baking time is in the range of 1 to 5 hours. If the baking temperature is lower than 350° C., moisture adsorbed to nickel surface is not completely removed. When carrying out fluorination under such a moisture condition, composition of the formed film passivated by fluorination is $NiF_3.4H_2O$, and any passivated film completely satisfying stoichiometric ratio is not obtained. The baking temperature for aluminum and aluminum alloy is in the range of 150° to 400° C., preferably in the range of 200° to 300° C. The baking time is in the range of 1 to 5 hours. For baking the stainless steel, the baking temperature is in the range of 200° to 500° C., preferably in the range of 250° to 450° C., and the baking time is in the range of 1 to 5 hours.

Fluorinating temperature for stainless steel is in the range of 100° to 300° C., preferably in the range of 150° to 265° C. Fluorinating time is in the range of 1 to 5 hours. If the fluorinating temperature is lower than 265° C., $FeF_2$ is produced. To the contrary, if the fluorinating temperature is higher than 265° C., $FeF_3$ is produced. If a large amount of $FeF_3$ is produced, the film formed is cubically expanded because bulk density of $FeF_2$ is 1.16 times as much as $FeF_3$, eventually resulting in cracking and peeling of the film. If the fluorinating temperature is less than 100° C., any film of sufficient thickness cannot be obtained.

Fluorinating temperature for nickel, monel, copper, copper alloy and chromium is in the range of 200° to 500° C., preferably in the range of 250° to 450° C. Fluorinating time is in the range of 1 to 5 hours. If the fluorinating temperature is lower than 200° C., any film passivated by fluorination having sufficient thickness and excellent corrosion resistance cannot be obtained. If carrying out the fluorination at a temperature high than 450° C., grain boundary of nickel fluoride is generated in the passivated film, which results in cracking and peeling.

Fluorinating temperature for hastelloy C is in the range of 150° to 300° C., preferably in the range of 150° to 250° C. If the fluorinating temperature is higher than 300° C., peeling will occur and any film passivated by fluorination of excellent corrosion resistance cannot be obtained.

Fluorinating temperature for aluminum and aluminum alloy is in the range of 200° to 400° C., preferably in the range of 250° to 350° C. If the fluorinating temperature is higher than 350° C., grain boundary of aluminum fluoride is generated in the passivated film, which also results in cracking and peeling.

Fluorination should be generally carried out at normal temperature, and it may be also carried out under pressure, when required. The pressure to be applied can be not more than 2 atm in gauge pressure.

Fluorination is preferably carried out under the atmosphere where no oxygen exists. Accordingly, it is preferable that fluorine is used either alone in the form of a simple substance or after being diluted with such inert gas as $N_2$, Ar, He or the like. When analyzing a passivated film of nickel formed at the temperature not higher than 450° C. by X-ray diffraction with SSX-100 type ESCA (manufactured by Surface Science Instruments' Products), it is found that ratio of Ni to F is about 1.1 time as much as stoichiometric ratio of $NiF_2$, despite that composition of the formed passivated film is $NiF_2$. This means that amount of fluorine is excessive by 10% with respect to nickel. This excessive fluorine is not combined with nickel but exists freely in the passivated film. This excessive fluorine existing freely is an obstacle to corrosion resistance, and corrosion resistant material is not obtained. Every passivated film disclosed heretofore contains such an excessive fluorine and exhibits no corrosion resistance at all.

Heat-treating temperature for stainless steel of the invention is in the range of 200° to 600° C., preferably in the range of 300° to 500° C. Heat-treating temperature for nickel, nickel alloy, copper, copper alloy and chromium of the invention is in the range of 300° to 600° C., preferably in the range of 400° to 500° C., and that for aluminum and aluminum alloy of the invention is in the range of 200° to 400° C., preferably in the range of 250° to 400° C. A film passivated by fluorination which is satisfactorily solid, fine, adhesive to metal and corrosion resistant can be formed by application of heat treatment to the passivated for 1 to 5 hours under inert gas such as $N_2$, Ar, He. It is to be noted that the characteristic of a passivated film is significantly changed as mentioned above by heat-treatment thereof, which has never been acknowledged up to today. When analyzing this favorable change in film characteristic with ESCA, it was found that, after heat treatment, ratio of metal element to fluorine in the passivated film substantially satisfied the stoichiometric ratio. In addition, measurement of thickness of passivated film was performed by using AEP-100 type ellipsometer (manufactured by Shimadzu Corporation.

When carrying out the fluorination mentioned above, it is recommended to smooth the metal surface to be fluorinated beforehand. Smoothness is to be achieved by smoothing or polishing the metal surface like a mirror, i.e., to the level of Rmax=0.03-1.0 μm (maximum value of the difference between irregularities on the surface). As a result of a series of studies, the inventors found that corrosion resistance of a film passivated by fluorination which was formed on a metal surface smoothed to the extent of Rmax=0.03-1.0 μm prior to the passivation process, was greatly improved as compared with a film passivated by fluorination which was formed on a metal surface not smoothed. In this respect, there is no restriction on the means for smoothing the metal surface at all, and a variety of means can be freely selected including complex electropolishing, for example.

The film passivated by fluorination formed in this manner is generally not less than 200 Å in thickness, preferably not less than 300 Å, and since the passivated film is formed on a metal used as a base material of sufficient strength, the film is hardly peeled and cracked.

Described hereunder is an apparatus for treating gas (hereinafter referred to as "gas treating apparatus") in which a metal material with the film passivated by fluorination as mentioned above is incorporated at least at the parts to be in contact with corrosive gas. The metal material can be also used at the parts not in contact with corrosive gas as a matter of course.

As a result of researches and developments concerning the corrosion resistance of the apparatus to particular halogen gas and pollution of high purity gas, the inventors have found that the apparatus exhibits satisfiable corrosion resistance to particular halogen gas and does not pollute high purity particular halogen gas by forming a film passivated by metallic fluorination with fluorine gas on internal metal surfaces of the apparatus.

In this connection, the gas treating apparatus of the invention means every equipment and instrument for treating gas to be used in storage, distribution, reaction or generation of gas. More specifically, the gas treating apparatus of the invention includes gas cylinder, gas holder, pipe line, valve, RIE reactor, CVD reactor, excimer laser generator and the like.

The film passivated by fluorination in accordance with the invention exhibits an excellent corrosion resistance to halogen gas of strong corrosivity. The metal material with the film passivated by fluorination was very effective in manufacturing such device as ULSI which needs fine processing. In other words, insert gas such as $F_2$, HF which have never been able to utilize in the prior art is now successfully applicable. Accordingly, native oxide film of Si wafer, which has been able to remove only by a wet process using a liquid, can be now removed by HF gas. It may be said that the invention contributes significantly to lowering of process temperature and improvement of selectivity in material of substrate. Furthermore, the invention is most preferably applied to Excimer laser, whose improvement in reliability and durability have been an object to be accomplished for many years, as excitation light source in excitation of various photochemical reactions otherwise as light source for excimer laser stepper which is promising as exposure meter for ULSI whose pattern size is not larger than 0.5 micron. Wave lengths of KrF excimer laser and ArF excimer laser are respectively 248 nm and 193 nm respectively. These wave lengths are optimum in both excitation of photochemical reaction and exposure of submicron ULSI, though they have never been put into practical use in the conventional excimer lasers because fluctuation of output for each pulse exceeds 10% and life span thereof is one million pulses at the most.

In this respect, since the internal surface of the gas supply system is coated with a film passivated by fluorination in accordance with the invention and surfaces of electrodes of the excimer laser (ArF, KrF) are also coated with the passivated film, fluctuation for each pulse of the laser is improved to the extent of less than 1%, and life span thereof is prolonged up to tens of millions of pulses, which means that life of the excimer laser is prolonged up to one year on condition that the excimer laser is used as a stepper at the rate of 1 shot/min. Thus, the excimer laser will surely be put into practical use in the very near future.

In addition, high purity hydrogen fluoride gas can be successfully supplied by using the "dry etching apparatus" and "diluted anhydrous hydrogen fluoride gas generator" both developed and filed under separate applications by the same inventors as the present invention, and in combination with the use of these apparatuses, corrosion resistance of the apparatus of the invention is greatly improved.

BRIEF DESCRIPTION OF THE DRAWINGS

In the accompanying drawings forming a part of the present application.

DESCRIPTION OF THE PREFERRED EMBODIMENTS

Figure 1:
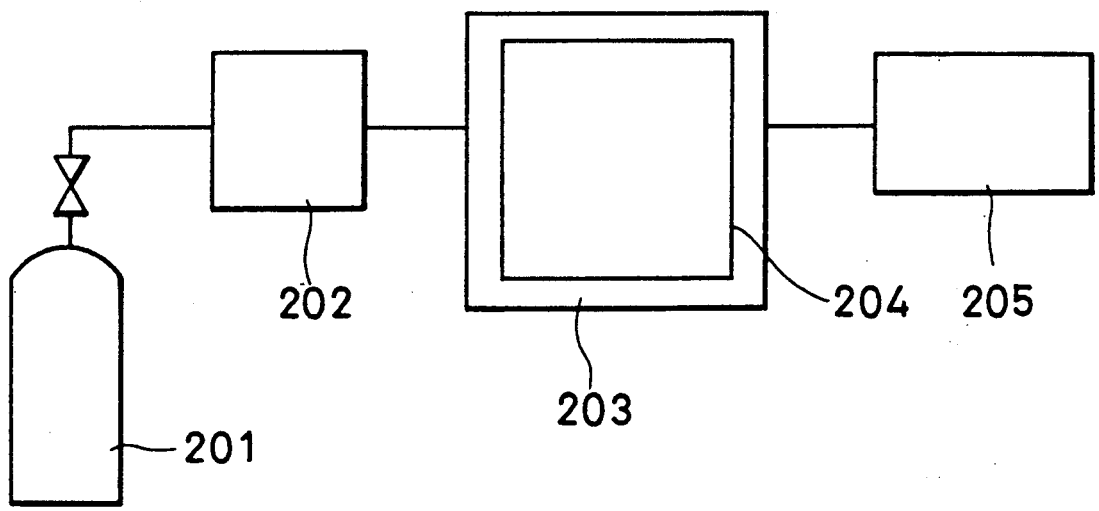
FIG. 1 is a schematic block diagram showing an example of the gas treating apparatus according to the present invention.

Referring now to FIG. 1 showing a schematic view of the gas treating device of the invention, the gas treating device comprises a gas storage cylinder 201; a gas supply system 202 in which valves, a mass flow controller, etc. are incorporated; a reactor 203 in which RIE device, CVD device, etc. are incorporated; and a vacuum exhauster 205. A film 204 passivated by fluorination is formed on the inner wall of the chamber of the reactor 203.

Figure 2:
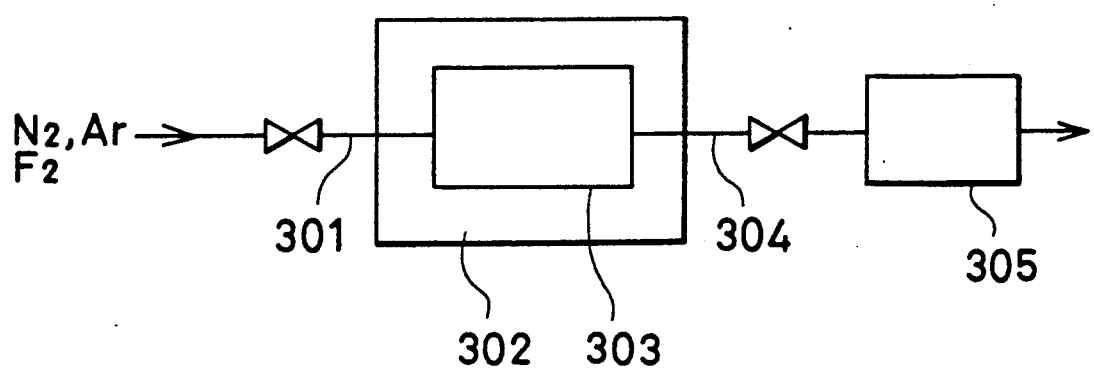
FIG. 2 is a schematic block diagram of an example of a method for fluorinating the reaction chamber.

Referring to FIG. 2 showing an example of the passivation of the inner wall of the reaction chamber, first, dewatering (dehydration) of the reaction chamber is carried out by introducing a high purity $N_2$ or Ar to the reaction chamber 303 through the gas introduction line 301 at the rate of 10 l/min. or so, then applying purge to the internal part of the reaction chamber. Whether or not the dewatering is sufficiently carried out can be acknowledged by monitoring the dew point of the purge gas with a dew-point meter 305 disposed on the purge line 304. Thereafter, the chamber 303 is entirely heated to 400° to 500° C. or so with an electric furnace 302 so that $H_2O$ molecule adsorbed to the internal surface of the chamber may be substantially dehydrated.

Then, a high purity $F_2$ is introduced into the chamber to carry out fluorination of the internal surface of the chamber. After the fluorination for a predetermined time, either an ultra-high purity $N_2$ or Ar is introduced into the chamber to purge the high purity $F_2$ residual in the chamber. Leaving the ultra-high purity $N_2$ or Ar to flow freely after the purging, the passivated film formed on the inner wall of the chamber is heat-treated. The obtained film passivated by such treatment nation is very stable with respect to corrosive gas.

Gases useful for this gas treatment apparatus are inert gases such as nitrogen, argon or helium, and halogen gas such as $F_2$, $Cl_2$, $NF_3$, $CF_4$, $SF_4$, $SF_6$, $SiF_4$, $BF_3$, $HF$, $WF_6$, $MoF_6$, $PF_3$, $PF_5$, $AsF_3$, $AsF$, $BCl_3$, etc. for constructing the apparatus using any of the passivated metals mentioned above, it is preferable that the apparatus is arranged by the metal on which passivated film is preliminarily prepared by fluorination. It is also preferable that the passivated film is prepared by fluorination on the required parts of the apparatus after arranging the apparatus. The fluorination can be carried out on the conditions described above.

EXAMPLES

For the purpose of disclosing the technological features of the invention more specifically, described hereinafter are representative examples:

EXAMPLE 1

Polished nickel plates (surface flatness Rmax=0.03 to 1.0 μm) and surfaces of nickel films of 4000 Å each formed by sputtering on a SUS-316L substrate were respectively baked under high purity $N_2$ gas at 500° C. for 1 hour, then fluorinated with 100% $F_2$ gas for 1 to 5 hours, and further heat-treated under inert gas at 500° C. for 2 hours. Table 1 shows film thickness of each sample according to the fluorinating temperature thereof. It was found that there was no grain boundary, crack and peeling in the film formed by fluorination at respective temperatures in both polished nickel plate and nickel film formed by sputtering.

TABLE 1

Temperature of formation of films passivated by fluorination and film thickness

| Film formation temp. (°C.) | 200 | 300 | 400 |
|---|---|---|---|
| Film thickness (Å) (polished nickel plate) | 50 | 300 | 1800 |
| Film thickness (Å) (nickel film by sputtering) | 80 | 350 | 1900 |

EXAMPLE 2

Polished hastelloy C (Ni51, Mo19, Cr17, Fe6 W5) plates (surface flatness Rmax=0.03 to 1.0 μm) were baked under high purity $N_2$ gas at 500° C. for 1 hour, then fluorinated with 100% $F_2$ gas for 1 to 5 hours, and further heat-treated under inert gas at 400° C. for 2 hours. Table 2 shows film thickness of each sample according to fluorinating temperature thereof. It was found that there was no crack and peeling in the films formed by fluorination at temperatures of 200° and 250° C.

TABLE 2

Temperature of formation of films passivated by fluorination and film thickness

| Film formation temp. (°C.) | 200 | 250 |
|---|---|---|
| Film thickness (Å) | 1200 | 2100 |

EXAMPLE 3

Polished monel (Ni66, Cu29, Al3) plates (surface flatness Rmax=0.03 to 1.0 μm) were baked under high purity $N_2$ gas at 500° C. for 1 hour, then fluorinated with 100% $F_2$ gas for 1 to 5 hours. Table 3 shows film thickness of each sample according to fluorinating temperature thereof. It was found that there was no crack and peeling in the films, though there was some unevenness of color on the surface of the passivated film formed at fluorinating temperature of 500° C.

TABLE 3

Temperature of formation of films passivated by fluorination and film thickness

| Film formation temp. (°C.) | 300 | 400 | 500 |
|---|---|---|---|
| Film thickness (Å) | 1300 | 2100 | 3400 |

EXAMPLE 4

Polished copper plates (surface flatness Rmax=0.03 to 1.0 μm) and surfaces of copper films of 4000 Å each formed by sputtering on a SUS-316L substrate were respectively baked under high purity $N_2$ gas at 500° C. for 1 hour, then fluorinated with 100% $F_2$ gas for 1 to 5 hours, and further heat-treated under inert gas at 500° C. for 2 hours. Table 4 shows film thickness of each sample according to fluorinating temperature thereof. It was found that there was no crack and peeling in the passivated films in both polished copper plate and copper film formed by sputtering.

TABLE 4

Temperature of formation of films passivated by fluorination and film thickness

| Film formation temp. (°C.) | 300 | 400 | 500 |
|---|---|---|---|
| Film thickness (Å) (polished copper plate) | 1500 | 2200 | 3500 |
| Film thickness (Å) (copper film by sputtering) | 1600 | 2200 | 3600 |

EXAMPLE 5

Surfaces of chromium films of 4000 Å each formed by sputtering on a SUS-316L substrate were respectively baked under high purity $N_2$ gas at 500° C. for 1 hour, then fluorinated with 100% $F_2$ gas for 1 to 5 hours, and further heat-treated under inert gas at 500° C. for 2 hours. Table 5 shows film thickness of each sample according to fluorinating temperature thereof. It was found that there was no crack and peeling in the passivated films fluorinated at respective temperatures.

TABLE 5

Temperature of formation of passivated films by fluorination and film thickness

| Film formation temp (°C.) | 300 | 400 | 500 |
|---|---|---|---|
| Film thickness (Å) | 1500 | 2200 | 3500 |

EXAMPLE 6

Polished aluminum plates, polished aluminum alloy plates (surface flatness Rmax=0.03 to 1.0 μm) and surfaces of aluminum films of 2000 Å each formed by sputtering on a SUS-316L substrate were respectively baked under high purity $N_2$ gas at 300° C. for 1 hour, then fluorinated with 100% $F_2$ gas for 1 to 5 hours, and further heat-treated under inert gas at 350° C. for 2 hours. Table 6 shows film thickness of each sample according to fluorinating temperature thereof. It was found that there was no grain boundary, crack and peeling of the aluminum fluoride in any of the polished aluminum plates, polished aluminum alloy plates and aluminum films formed by sputtering mentioned above fluorinated at temperatures of 250° and 350° C.

TABLE 6

Temperature of formation of films passivated by fluorination and film thickness

| Film formation temp. (°C.) | 200 | 300 |
|---|---|---|
| Film thickness (Å) (polished aluminum plate #1050) | 450 | 600 |
| Film thickness (Å) (polished aluminum plate #3003) | 500 | 750 |
| Film thickness (Å) (polished aluminum plate #5052) | 550 | 800 |
| Film thickness (Å) (aluminum film by sputtering) | 700 | 1100 |

EXAMPLE 7

Figure 3:
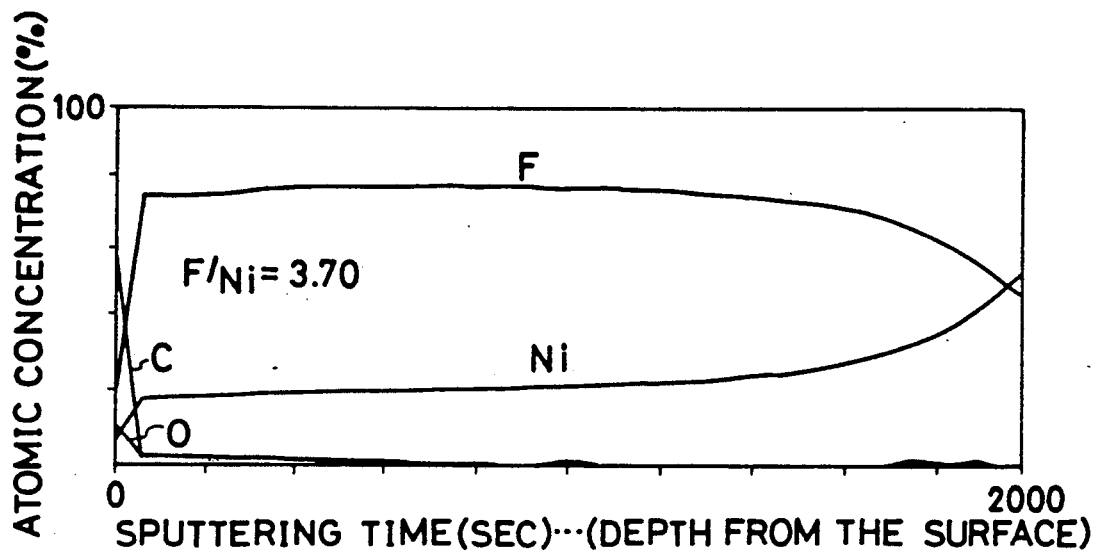
FIG. 3 is an ESCA chart of a nickel surface which was baked under high purity $N_2$ gas at 500° C. for 1 hour and fluorinated under 100% $F_2$ gas at 350° C. for 1 to 5 hours.
Figure 4:
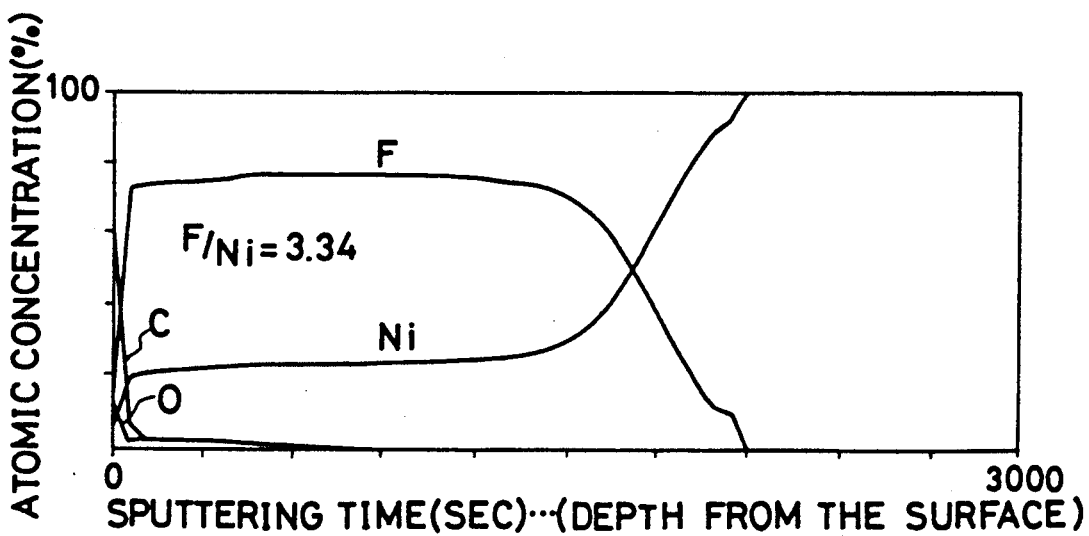
FIG. 4 is an ESCA chart of a nickel surface which was baked under high purity $N_2$ gas at 500° C. for 1 hour, then fluorinated under 100% $F_2$ gas at 350° C. for 1 to 5 hours, and further heat-treated under high purity $N_2$ gas at 400° C. for 2 hours.

A polished nickel plates (surface flatness Rmax=0.03 to 1.0 μm) was baked under high purity $N_2$ gas at 500° C. for 1 hour, then fluorinated with 100% $F_2$ gas at 350° C. for 1 to 5 hours. FIG. 3 shows an ESCA chart of the surface of the fluorinated nickel plate. The fluorinated nickel plate was further heat-treated under high purity $N_2$ ga at 400° C. for 2 hours. FIG. 4 shows an ESCA chart of the surface of the heat-treated nickel. Average atomic ratio of Ni to F in FIG. 3 is 3.7, and that shown in FIG. 4 is 3.34. This means that fluorine existing in the fluorinated film before the heat treatment was 1.1 time as much as that existing in the fluorinated film after the heat treatment. The atomic ratio of 3.34 after the heat treatment is not coincident with chemical structure $NiF_2$ of the passivated film obtained by X-ray diffraction. This is because no calibration was applied to the ESCA. It is obvious that the improvement in composition ratio shown in FIGS. 3 and 4 was achieved as a result of the heat treatment.

EXAMPLE 8

Figure 5:
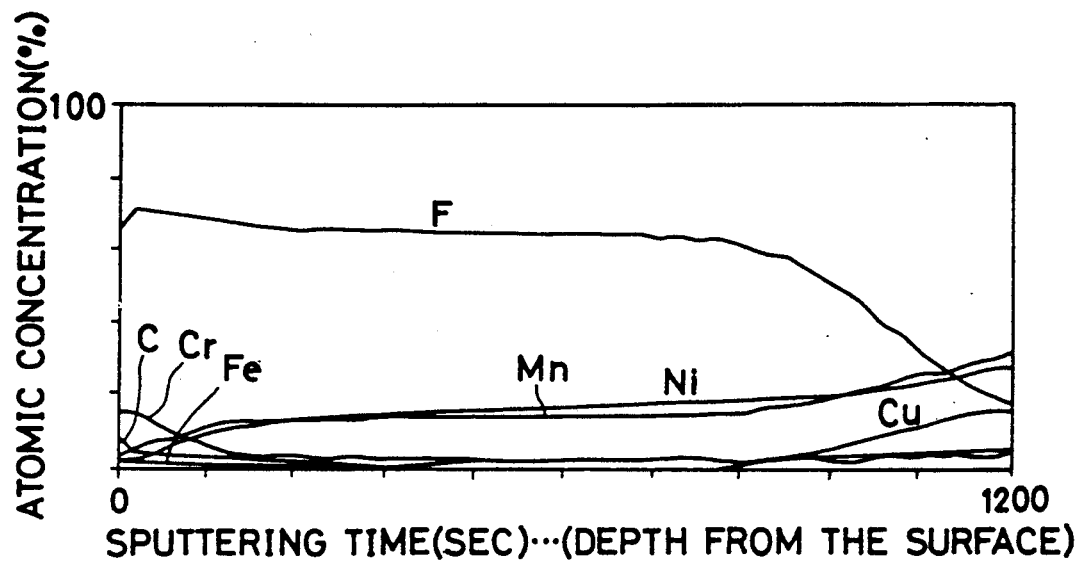
FIG. 5 is an ESCA chart of the monel surface which was baked under high purity $N_2$ gas at 500° C. for 1 hour, then fluorinated under 100% $F_2$ gas at 400° C. for 1 to 5 hours, and further heat-treated under high purity $N_2$ gas at 500° C. for 2 hours.

A polished monel (Ni66, Cu29, Al3) plate (surface flatness Rmax=0.03 to 1.0 m) was baked under high purity $N_2$ gas at 500° C. for 1 hour, then fluorinated with 100% $F_2$ gas at 400° C. for 1 to 5 hours, and further heat-treated under high purity $N_2$ gas at 500° C. for 2 hours. FIG. 5 shows an ESCA chart of the monel plate thus treated.

EXAMPLE 9

Figure 6:
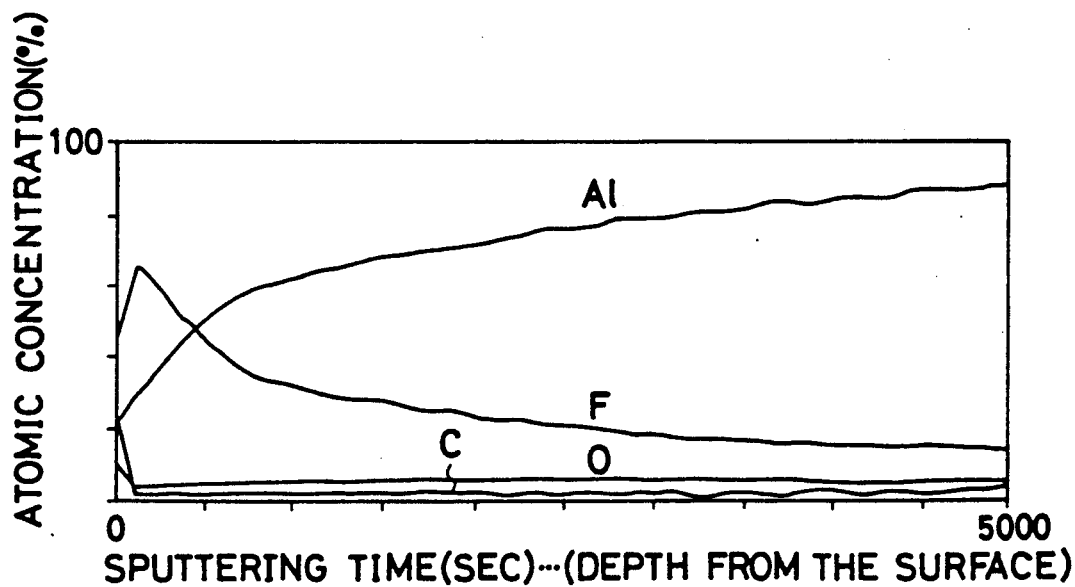
FIG. 6 is an ESCA chart of the aluminum surface which was baked under high purity $N_2$ gas at 300° C. for 1 hour, then fluorinated under 100% $F_2$ gas at 250° C. for 1 to 5 hours, and further heat-treated under high purity $N_2$ gas at 350° C. for 2 hours.

A polished aluminum (#1050) plate (surface flatness Rmax=0.03 to 1.0 μm) was baked under high purity N, gas at 300° C. for 1 hour, then fluorinated with 100% $F_2$ gas at 250° C. for 1 to 5 hours, and further heat-treated under high purity $N_2$ gas at 350° C. for 2 hours. FIG. 6 shows an ESCA chart of the aluminum plate thus treated.

EXAMPLE 10

Figure 7:
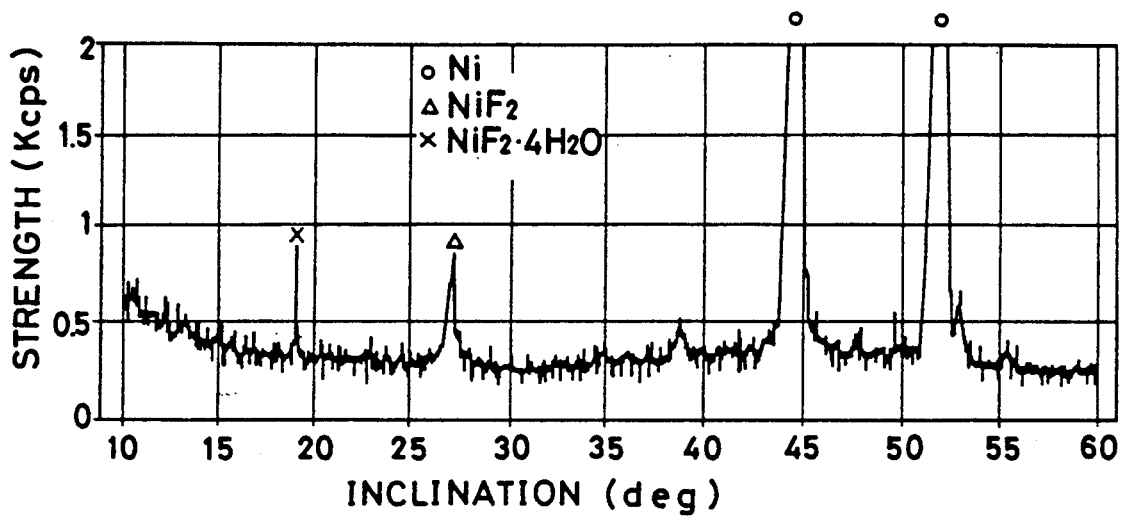
FIG. 7 is a X-ray diffraction chart of a film passivated by fluorination formed on a polished nickel plate which was baked under high purity $N_2$ gas at 350° C. for 1 hour, then fluorinated under 100% $F_2$ gas at 350° C. for 1 to 5 hours, and further heat-treated under high purity $N_2$ gas at 400° C. for 2 hours.
Figure 8:
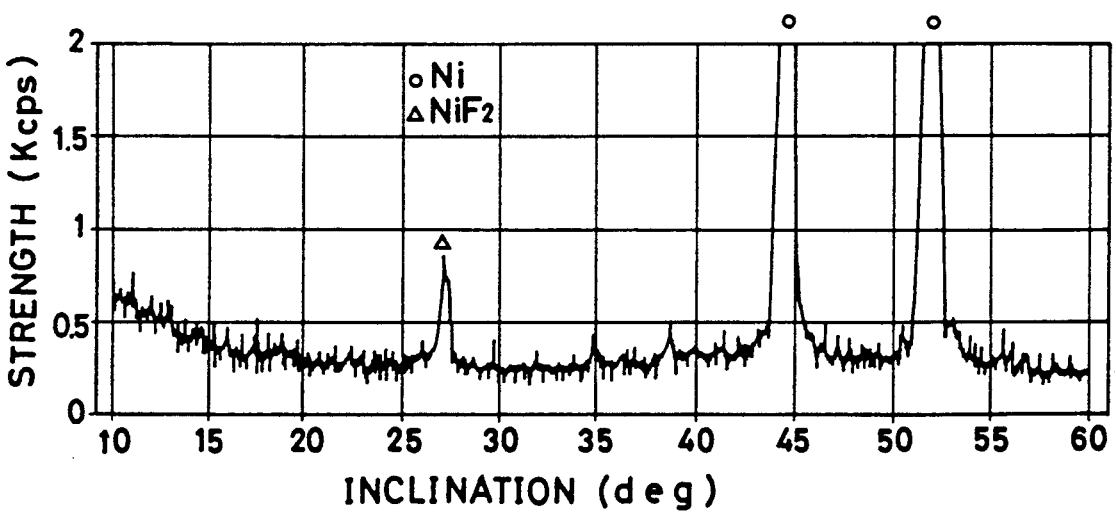
FIG. 8 is a X-ray diffraction chart of a film passivated by fluorination formed on a polished nickel plate which was baked under high purity $N_2$ gas at 400° C. for 1 hour, then fluorinated under 100% $F_2$ gas at 350° C. for 1 to 5 hours, and further heat-treated under high purity $N_2$ gas at 400° C. for 2 hours.

A polished nickel plate (surface flatness Rmax=0.03 to 1.0 μm) was baked under high purity $N_2$ gas at 350° C. for 1 hour, then fluorinated with 100% $F_2$ gas at 350° C. for 1 to 5 hours, and further heat-treated under high purity $N_2$ gas at 400° C. for 2 hours. FIG. 7 shows an X-ray diffraction chart of the nickel plate thus treated. Another identical nickel plate was baked under high purity $N_2$ gas at 400° C. for 1 hour, then fluorinated with 100% $F_2$ gas at 350° C. for 1 to 5 hours, and further heat-treated under a high purity $N_2$ gas at 400° C. for 2 hours. FIG. 8 shows an X-ray diffraction chart of the nickel plate thus treated. In the X-ray chart of the nickel plate baked at 350° C., a peak of $NiF_2.4H_2O$ is found in addition to that of $NiF_2$. On the other hand, in the X-ray chart of the nickel plate baked at 400° C., the peak of $NiF_2$ alone is found. Cracking and peeling occur in the fluorinated film with $NiF_2.4H_2O$, and any passivated film of excellent corrosion resistance cannot be obtained thereby.

EXAMPLE 11

Figure 9:
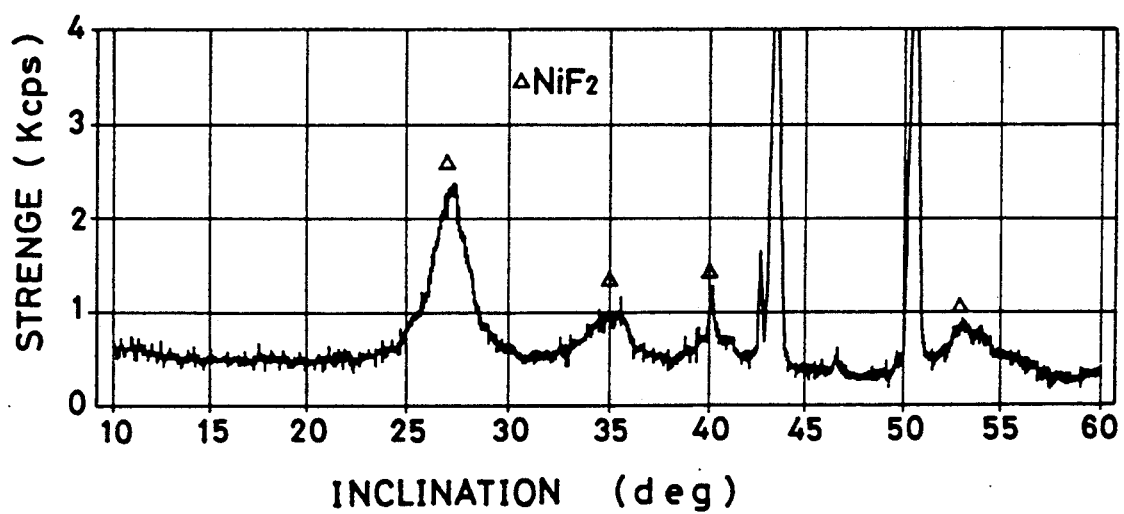
FIG. 9 is a X-ray diffraction chart of a film passivated by fluorination formed on a hastelloy C surface which was baked under high purity $N_2$ gas at 400° C. for 1 hour, then fluorinated under 100% $F_2$ gas at 250° C. for 1 to 5 hours, and further heat-treated under high purity $N_2$ gas at 400° C. for 2 hours.

A polished hastelloy C (Ni51, Mo19, Cr17, Fe6, W5) plate (surface flatness Rmax=0.03 to 1.0 μm) was baked under high purity $N_2$ gas at 500° C. for 1 hour, then fluorinated with 100% $F_2$ gas at 250° C. for 1 to 5 hours, and further heat-treated under high purity $N_2$ gas at 400° C. for 2 hours. FIG. 9 shows an X-ray diffraction chart of the nickel plate thus treated.

EXAMPLE 12

Figure 10:
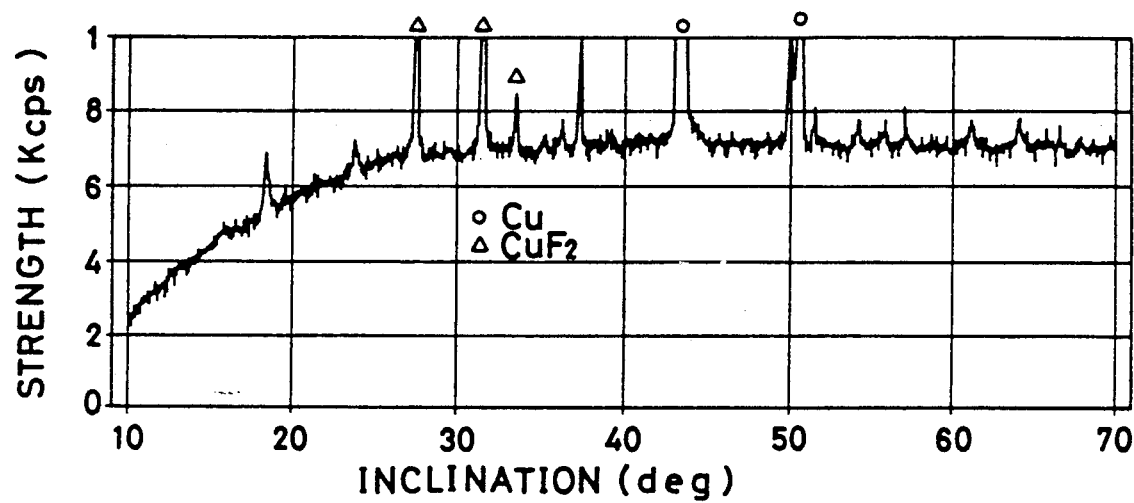
FIG. 10 is a X-ray diffraction chart of a film passivated by fluorination formed on a polished copper plate disk which was baked under high purity $N_2$ gas at 500° C. for 1 hour, then fluorinated under 100% $F_2$ gas at 400° C. for 1 to 5 hours, and further heat-treated under high purity $N_2$ gas at 500° C. for 2 hours.

A polished copper plate (surface flatness Rmax=0.03 to 1.0 μm) was baked under high purity $N_2$ gas at 500° C. for 1 hour, then fluorinated with 100% $F_2$ gas at 400° C. for 1 to 5 hours, and further heat-treated under high purity gas at 500° C. for 2 hours. FIG. 10 shows an X-ray diffraction chart of the copper plate thus treated. A sharp peak of $CuF_2$ was obtained.

EXAMPLE 13

Figure 11:
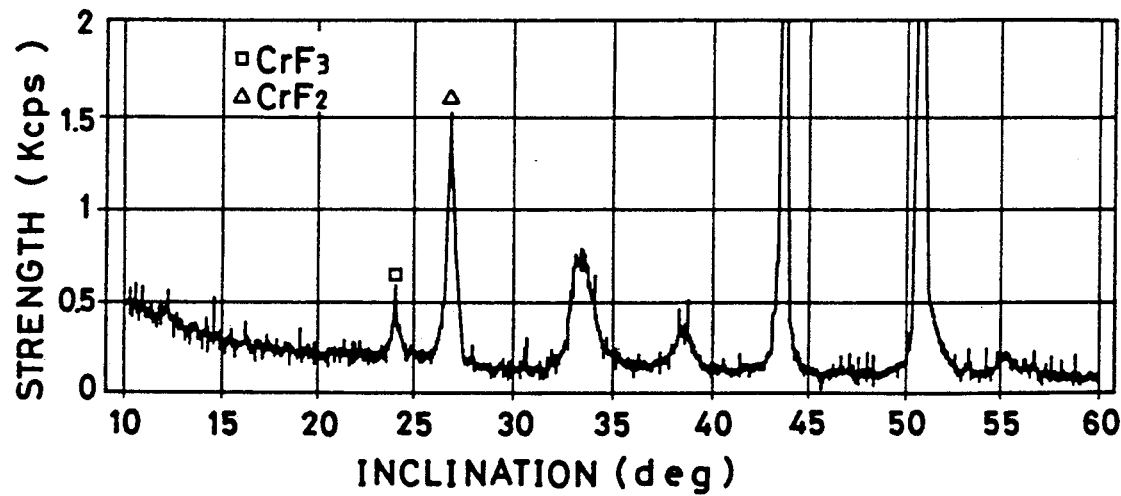
FIG. 11 is a X-ray diffraction chart of a film passivated by fluorination formed on a sputtered chromium which was baked under high purity $N_2$ gas at 500° C. for 1 hour, then fluorinated under 100% $F_2$ gas at 400° C. for 1 to 5 hours, and further heat-treated under high purity $N_2$ gas at 500° C. for 2 hours.

Surface of a chromium film of 4000 Å formed by sputtering on a SUS-316L substrate was baked under high purity $N_2$ gas at 500° C. for 1 hour, then fluorinated with 100% $F_2$ gas at 400° C. for 1 to 5 hours, and further heat-treated under high purity gas at 500° C. for 2 hours. FIG. 11 shows an X-ray diffraction chart of the chromium thus treated. A sharp peak of $CrF_2$ was obtained.

EXAMPLE 14

Figure 12:
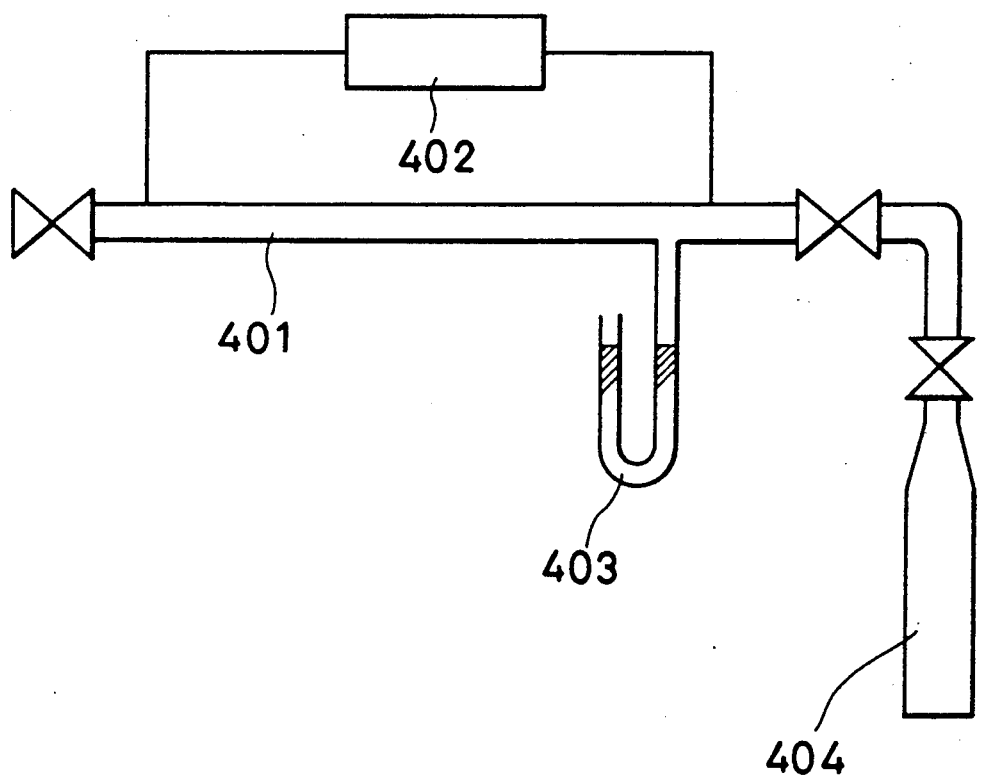
FIG. 12 is an explanatory view of a device used for evaluation of the passivated film shown in Example 14.

Table 7 shows evaluation of corrosion resistance of the films passivated by fluorination to chlorine gas, i.e., the most corrosive and permeable gas. In the evaluation, a chlorine gas was hermetically charged at atmospheric pressure into an electropolished nickel pipe of ¼ inch in diameter on which passivated films of different thickness are respectively formed, then was left at 100° C. for 1 hour. Amount of reaction of the gas was calculated as a difference between the pressure in the pipe immediately after the sealing and the pressure after being left for 1 hour. FIG. 12 shows a schematic view of the apparatus used in the evaluation. It was found that, in the passivated films of not less than 200 Å in thickness, their corrosion resistance was high if heat-treated.

TABLE 7

Corrosion resistance of passivated film to chlorine gas

| | Thickness of passivated films in the electropolished nickel pipe (Å) | | | | | | | |
|---|---|---|---|---|---|---|---|---|
| | 0 | | 50 | | 200 | | 750 | |
| Heat treatment | No | Yes | No | Yes | No | Yes | No | Yes |
| Reaction amount of $Cl_2$ gas (μg/cm²) | 4.0 | 4 0 | 3.5 | 3.5 | 1 0 | 0 | 0.7 | 0 |

EXAMPLE 15

Table 8 shows evaluation of corrosion resistance of the passivated films to hydrogen fluoride gas containing moisture which accelerates corrosion. In the evaluation, test pieces with different passivated films were sealed in the gases of following compositions at 25° C. for 14 days, then corrosion level of the passivated film of each test piece was checked. It was found that each sample of 200 Å in film thickness was not corroded at all if heat-treated. Composition of sealing gas (vol %) was HF:5, $H_2O$:2.5 and $N_2$:92.5.

TABLE 8

| Sample | Corrosion resistance of passivated films to hydrogen fluoride gas containing moisture | | |
|---|---|---|---|
| | Passivated film thickness (Å) | Corrosion | |
| | | Not heat-treated | Heat-treated |
| Polished Ni plate | 1800 | Occurred | Not occurred at all |
| Ni film by sputtering | 1900 | Occurred | Not occurred at all |
| Polished hastelloy C plate | 2100 | Occurred | Not occurred at all |
| Polished monel plate | 1300 | Occurred | Not occurred at all |
| Polished Cu plate | 1500 | Occurred | Not occurred at all |
| Cu film by sputtering | 1600 | Occurred | Not occurred at all |
| Cr film by sputtering | 1400 | Occurred | Not occurred at all |
| Polished Al plate #1050 | 600 | Occurred | Not occurred at all |
| Al film by sputtering | 1100 | Occurred | Not occurred at all |

EXAMPLE 16

Polished brass (Cu 70, Zn 30) plates (surface flatness Rmax=0.03 to 1.0 μm) were baked under high purity $N_2$ gas at 300° C. for 1 hour, then fluorinated with 100% $F_2$ gas for 1 to 5 hours, and further heat-treated under inert gas at 350° C. for 2 hours. Table 9 shows thickness of the passivated films formed at each fluorinating temperature. At any fluorinating temperature, no crack or peeling of the passivated films was found.

TABLE 9

| Temperature of formation of films passivated by fluorination and film thickness | | |
|---|---|---|
| Film formation temp. (°C.) | 200 | 250 |
| Film thickness (Å) | 850 | 1200 |

EXAMPLE 17

Polished SUS-316L plates (surface flatness Rmax=0.03 to 1.0 μm) were fluorinated with 100% $F_2$ gas for 2 hours thereby passivated films being formed, and further heat-treated under inert gas at 300° C. for 2 hours. Table 10 shows thickness of the passivated films formed at each fluorinating temperature. Some crack and peeling were found in the film fluorinated and formed at 305° C.

TABLE 10

| Temperature of formation of films passivated by fluorination and film thickness | | | | |
|---|---|---|---|---|
| Film formation temp. (°C.) | 150 | 200 | 250 | 305 |
| Film thickness (Å) | 500 | 1040 | 2250 | 4100 |

EXAMPLE 18

Figure 13:
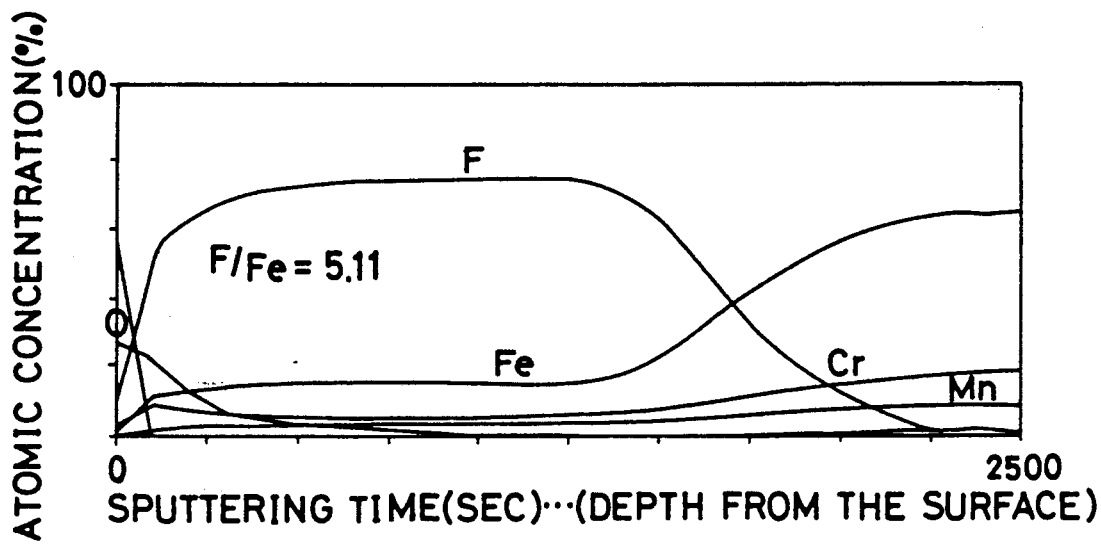
FIG. 13 is an ESCA chart showing distribution of elements in a passivated film which was fluorinated under 100% $F_2$ gas at 200° C. for 2 hours.
Figure 14:
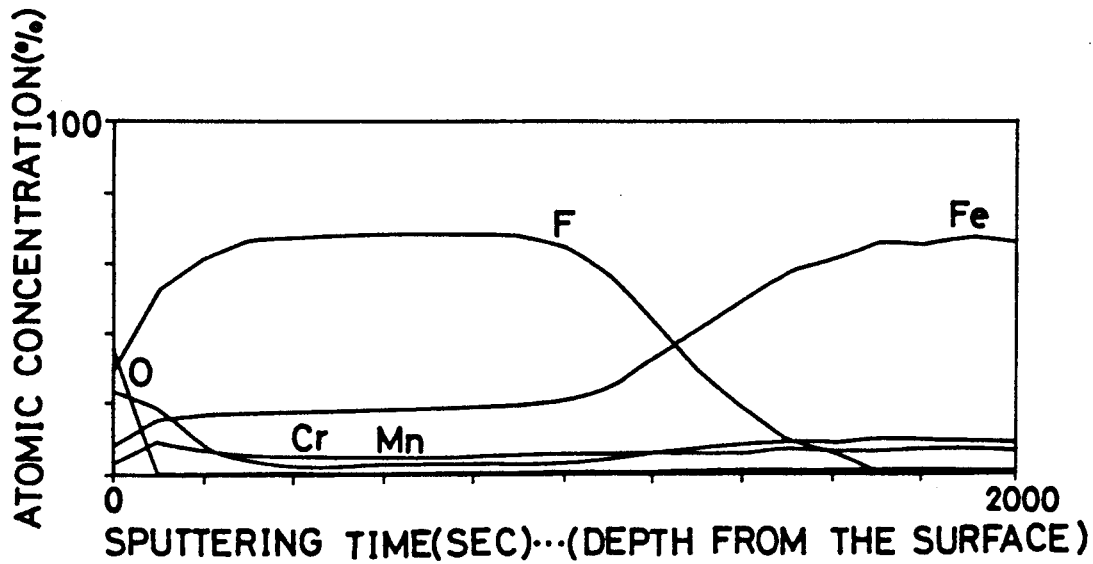
FIG. 14 is an ESCA chart showing distribution of elements in a passivated film which was fluorinated under 100% $F_2$ gas at 200° C. for 2 hours, and heat-treated under inert gas at 300° C. for 2 hours.

A polished SUS-316L plate (surface flatness Rmax=0.03 to 1.0 μm) was fluorinated with 100% $F_2$ gas at 200° C. for 2 hours thereby a passivated film being formed. FIG. 13 shows an ESCA chart of the fluorinated SUS-316L plate. Then, the fluorinated plate was further heat-treated under high purity $N_2$ gas at 300° C. for 2 hours. FIG. 14 shows an ESCA chart of the SUS-316L plate thus treated.

Atomic ratio of Fe to F for the sputtering time of 500 to 1000 seconds shown in FIG. 13 is 5.11, while that for 400 to 800 seconds shown in FIG. 14 is 3.66. This means that fluorine existing in the fluorinated film before the heat treatment was 5.11/3.66= about 1.4 time as much as that existing in the passivated film after the heat treatment. The atomic ratio of 3.66 after the heat treatment is not coincident with the ratio of chemical structure $FeF_2$ of the passivated film obtained by X-ray analysis. This is because calibration was not exactly applied to the ESCA. It is obvious that the improvement in composition ratio shown in FIGS. 13 and 14 was achieved as a result of the heat treatment.

EXAMPLE 19

Figure 15:
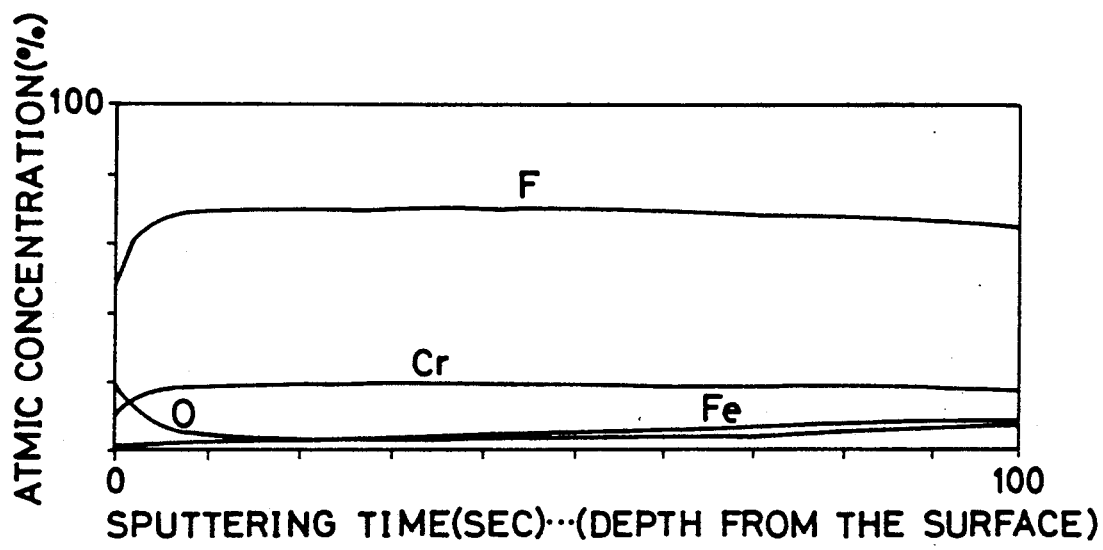
FIG. 15 is an ESCA chart showing distribution of elements in the vicinity of the surface of a passivated film which was fluorinated under 100% $F_2$ gas at 200° C. for 2 hours, and heat-treated under inert gas at 300° C. for 2 hours.
Figure 16:
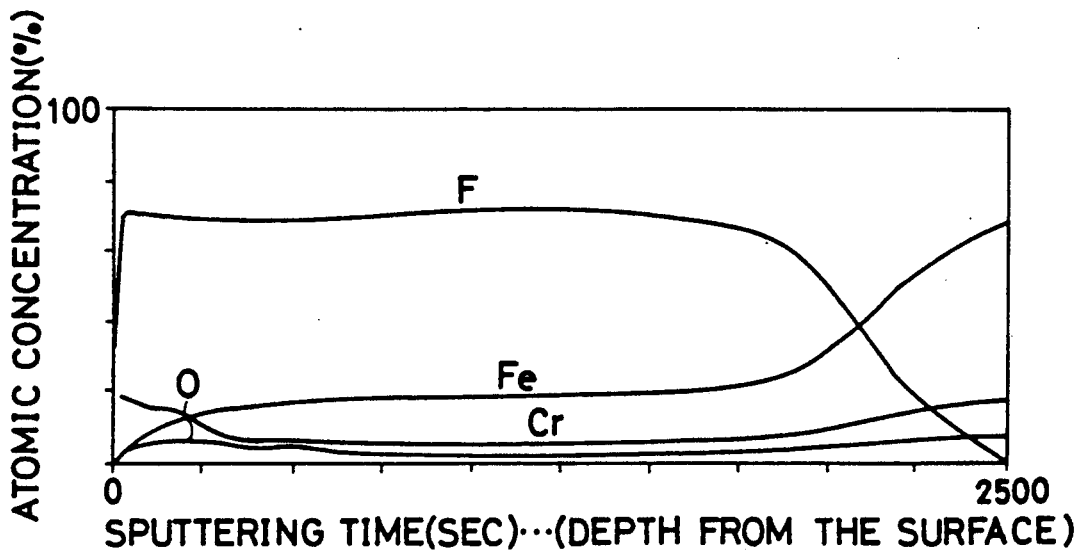
FIG. 16 is an ESCA chart showing elemental distribution up to the boundary of a stainless steel surface of a passivated film which was fluorinated under 100% $F_2$ gas at 200° C. for 2 hours, and heat-treated under inert gas at 300° C. for 2 hours.

A polished SUS-316L plate (surface flatness Rmax=0.03 to 1.0 μm) was fluorinated with 100% $F_2$ gas at 200° C. for 2 hours thereby a passivated film being formed, and was further heat-treated under inert gas at 300° C. for 2 hours. FIG. 15 shows an ESCA chart of the chromium fluoride formed in the vicinity of the surface of the passivated film thus treated. FIG. 16 shows an ESCA chart of the whole passivated film thus heat-treated up to the boundary with stainless steel. It is understood from Table 15 that a passivated film mainly composed of chromium fluoride exists in the vicinity of the surface of the passivated film, and from Table 16 that a mixed film of chromium fluoride and iron fluoride exists between the passivated film and the boundary with stainless steel. This film passivated by fluorination also satisfies the stoichiometric ratio. In other words, corrosion resistance was improved obviously as a result of the heat treatment.

EXAMPLE 20

Figure 17:
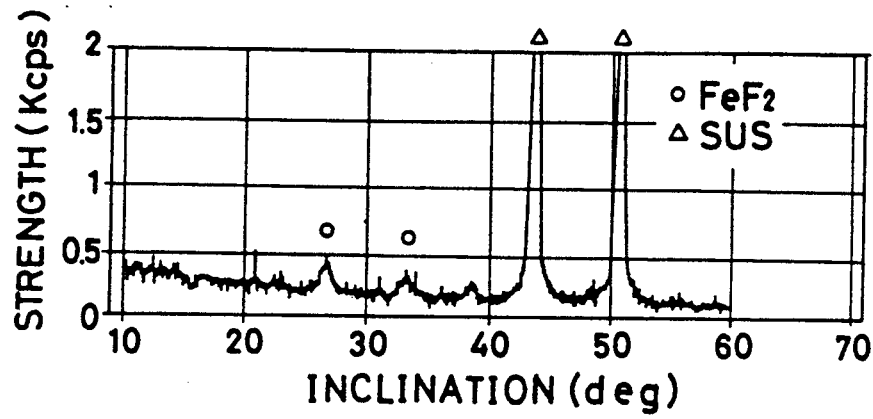
FIG. 17 is a chart of strength evaluated by X-ray diffraction of a passivated film which was fluorinated under 100% $F_2$ gas at 200° C. for 2 hours.
Figure 18:
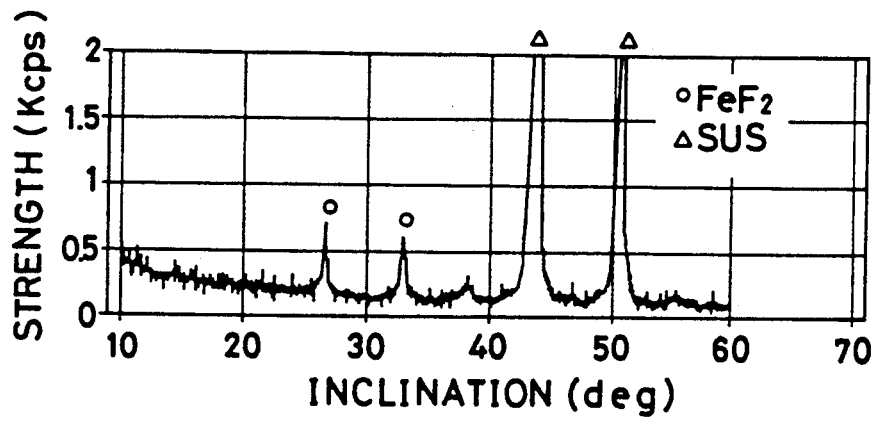
FIG. 18 is a chart of strength evaluated by X-ray diffraction of a passivated film which was fluorinated under 100% $F_2$ gas at 200° C. for 2 hours, and heat-treated under inert gas at 300° C. for 2 hours.

A polished SUS-316L plate (surface flatness Rmax=0.03 to 1.0 μm) was fluorinated with 100% $F_2$ gas at 200° C. for 2 hours thereby a passivated film being formed. FIG. 17 shows an X-ray diffraction chart of the fluorinated SUS-316L plate. Then this fluorinated SUS-316L plate was further heat-treated under inert gas at 300° C. for 2 hours. FIG. 8 shows an X-ray diffraction chart of the heat-treated plate. Only $FeF_2$ is found in both FIGS. 17 and 18, but the peak of $FeF_2$ after the heat treatment shown in FIG. 18 is sharper. This means that with the progress of crystallization, the passivated film is stably formed.

COMPARATIVE EXAMPLE 1

Figure 19:
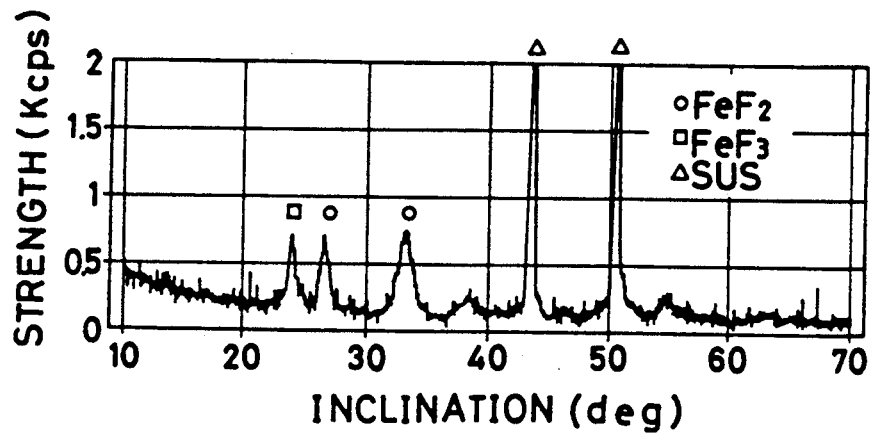
FIG. 19 is a chart of strength evaluated by X-ray diffraction of a passivated film which was fluorinated under 100% $F_2$ gas at 275° C. for 2 hours.

A polished SUS-316L plate (surface flatness Rmax=0.03 to 1.0 μm) was fluorinated with 100% $F_2$ gas at 275° C. for 2 hours thereby a passivated film being formed. FIG. 19 shows an X-ray diffraction chart of the fluorinated plate. $FeF_3$ was produced in the passivated film, and a partial peeling was found.

EXAMPLE 21

Table 11 shows an evaluation of corrosion resistance of the passivated films from the viewpoint of difference in flatness on the metal surface and whether or not heat treatment is applied. In the evaluation, SUS-316L test pieces of different surface conditions were fluorinated under 100% $F_2$ gas at 200° C. for 2 hours thereby passivated films being formed. Heat treatment of them was carried out at 300° C. for 2 hours. Corrosion resistance was checked by immersing the test pieces into 50% HF solution and measuring the time elapsed up to generation of $H_2$ bubbles from the metal surface. It was found that no even film was obtained and corrosion resistance was poor when fluorinating the non-polished surface and fluorinating the surface thereby forming a passivated film by heat treatment. On the other hand, when forming a passivated film on the polished surface and applying heat treatment thereto, even and fine films were obtained resulting in sharp improvement of corrosion resistance.

TABLE 11

|  | SUS-316L not polished | | SUS-3161 polished | |
|---|---|---|---|---|
| Application of heat treatment | No | Yes | No | Yes |
| Flatness of surface before forming passivated film Rmax (μm) | 2 to 5 | 2 to 5 | 0.03 to 1.0 | 0.03 to 1.0 |
| Flatness of surface after forming passivated film Rmax (μm) | 2 to 5 | 2 to 5 | 0.03 to 1.0 | 0.03 to 1.0 |
| Time up to $H_2$ bubbling (min) | 1 | 2 | 25 | 45 |

Example 22

Table 12 shows an evaluation of corrosion resistance of the films passivated by fluorination to chlorine gas, i.e., the most corrosive and permeable gas. In the evaluation, a chlorine gas was sealed at atmospheric pressure in a SUS-316L pipe of ¼ inch in diameter on which passivated films of different thickness are respectively formed, then was left at 100° C. for 1 hour. Amount of reaction of the gas was calculated as a difference between the pressure in the pipe immediately after the sealing and the pressure after being left for 1 hour. The same apparatus as shown in FIG. 10 was used in the evaluation. It was found that in the passivated films of not less than 500 Å in thickness, their corrosion resistance was high if heat-treated.

TABLE 12

|  | Thickness of passivated films in the SUS-316L pipe (Å) | | | | | | | |
|---|---|---|---|---|---|---|---|---|
|  | 0 | | 400 | | 660 | | 1040 | |
| Heat treatment | No | Yes | No | Yes | No | Yes | No | Yes |
| Reaction amount of $Cl_2$ gas (μg/cm$^2$) | 5.0 | 5.0 | 3.0 | 2.0 | 1.0 | 0 | 0.9 | 0 |

EXAMPLE 23

Table 13 shows an evaluation of corrosion resistance of the passivated films to hydrogen fluoride gas which contains moisture accelerating corrosion. In the evaluation, a gas of following composition was hermetically charged into a SUS-316L pipes with different passivated films at 25° C. for 72 hours, then corrosion of the inner wall of the pipe was checked. It was found that there was no corrosion at all in the passivated films of both 660 Å and 1040 Å in thickness. Composition (Vol %) of the sealed gas was HF: 5.0, $H_2O$:1.0 and $N_2$:94.

TABLE 13

|  | Thickness of passivated film in SUS316 pipe (Å) | | | | | | | |
|---|---|---|---|---|---|---|---|---|
|  | 0 | | 400 | | 660 | | 1040 | |
| Heat treatment | No | Yes | No | Yes | No | Yes | No | Yes |
| Corrosion level | High | High | High | Low | Med | Zero | Med | Zero |

EXAMPLE 24

Figure 20:
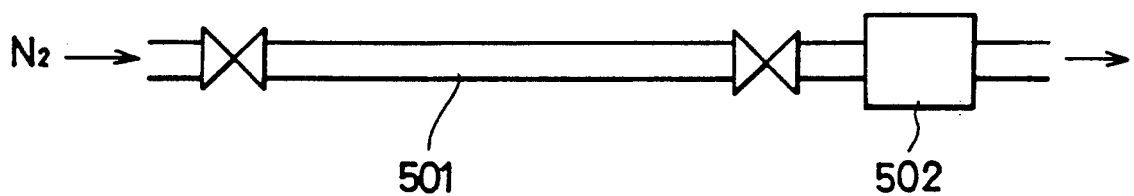
FIG. 20 is an explanatory view of a device used for evaluation of dehydration characteristic of the passivated film shown in Example 14.
Figure 21:
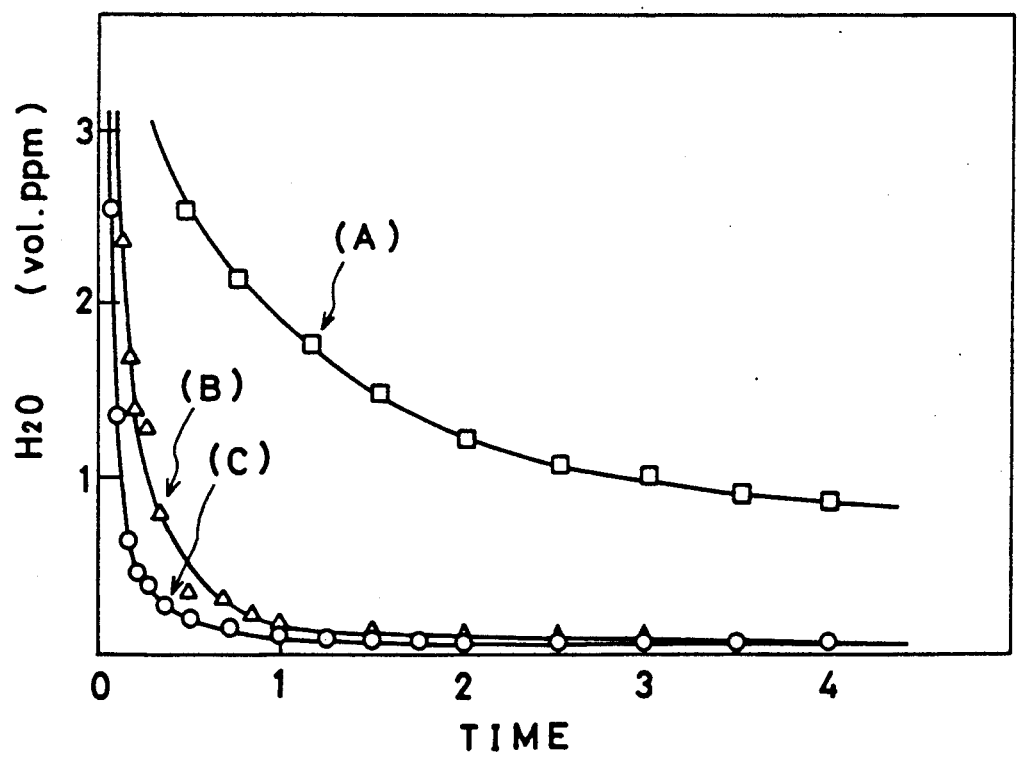
FIG. 21 is a diagram showing comparison of evaluation results of dehydration characteristics of the passivated films.

Degassing characteristic of film passivated by fluorination was evaluated. In the experiment for the evaluation, SUS-316L sample pipes of ¼ inch in diameter and 1 m in length were used. To establish the same moisture absorption condition for each sample, the samples are left for 72 hours in a clean room where humidity was preliminarily set to 50 % and temperature to 25° C., then the experiment was carried out. FIG. 20 shows a schematic view of the apparatus used in the experiment, and in which numeral 501 indicates a SUS-316L sample pipe of ¼ in diameter and 1 m in length and numeral 502 indicates a dew-point meter. In the experiment, moisture contained in the gas was measured by the dew-point meter 502 after passing a high purity $N_2$ gas (whose moisture was not more than 0.1 Vol ppm) through the sample pipe 501 at the rate of 500 cc/min. FIG. 21 shows results of the experiment carried out under normal temperature, and in which reference (B) indicates a sample of electropolished pipe, (A) indicates a sample of internal surface of the electropolished pipe which is fluorinated under $F_2$ gas at 200° C. for 2 hours, and (C) indicates a sample of same internal surface which was further heat-treated under inert gas at 300° C. for 2 hours.

As is obviously shown in FIG. 21, the sample pipe (A) to which only passivation was applied as mentioned above exhibits poor dehydration, while the sample pipe (C) which was passivated and heat-treated exhibits excellent dehydration characteristic.

EXAMPLE 25

A SUS-304 cylinder with film passivated by fluorination and a SUS-304 cylinder without passivated film were respectively filled with halogen compound gases shown in Table 14, and after leaving them for one week under normal temperature, the gases in the respective cylinders were analyzed by infrared spectrometer. Table 14 shows the results.

TABLE 14

| Sample gas | Impurity | Permeability at peak of impurity by infrared spectrometer (%) | |
|---|---|---|---|
|  |  | Cylinder without passivated film | Cylinder with passivated film |
| $F_2$ | 3878 cm$^{-1}$ HF absorbed | 0.8 | N.D* |
| $SF_4$ | 3878 cm$^{-1}$ HF absorbed | 2.9 | N.D |
| $SiF_4$ | 3878 cm$^{-1}$ HF absorbed | 0.8 | N.D |
| $BF_3$ | 3300 cm$^{-1}$ OH absorbed | 0.8 | N.D |
|  | 1120 cm$^{-1}$ B-O-B absorbed | 5.1 | N.D |
| $WF_6$ | 3878 cm$^{-1}$ HF absorbed | 2.7 | N.D |
| $MoF_6$ | 3878 cm$^{-1}$ HF absorbed | 2.3 | N.D |
| $PF_3$ | 3878 cm$^{-1}$ HF absorbed | 0.9 | N.D |
| $PF_5$ | 1433 cm$^{-1}$ PFO absorbed | 1.0 | N.D |

TABLE 14-continued

| Sample gas | Impurity | Permeability at peak of impurity by infrared spectrometer (%) | |
|---|---|---|---|
| | | Cylinder without passivated film | Cylinder with passivated film |
| AsF$_3$ | 3878 cm$^{-1}$ HF absorbed | 2.2 | N.D |
| AsF$_5$ | 811 cm$^{-1}$ AsOF absorbed | 7.5 | N.D |
| BCl$_3$ | 2950 cm$^{-1}$ HCl absorbed | 1.3 | N.D |

*ND: No peak was found
Infrared absorption cell: BaF$_2$ window plate
Concentration of gases: 760 Torr

EXAMPLE 26

Figure 22:
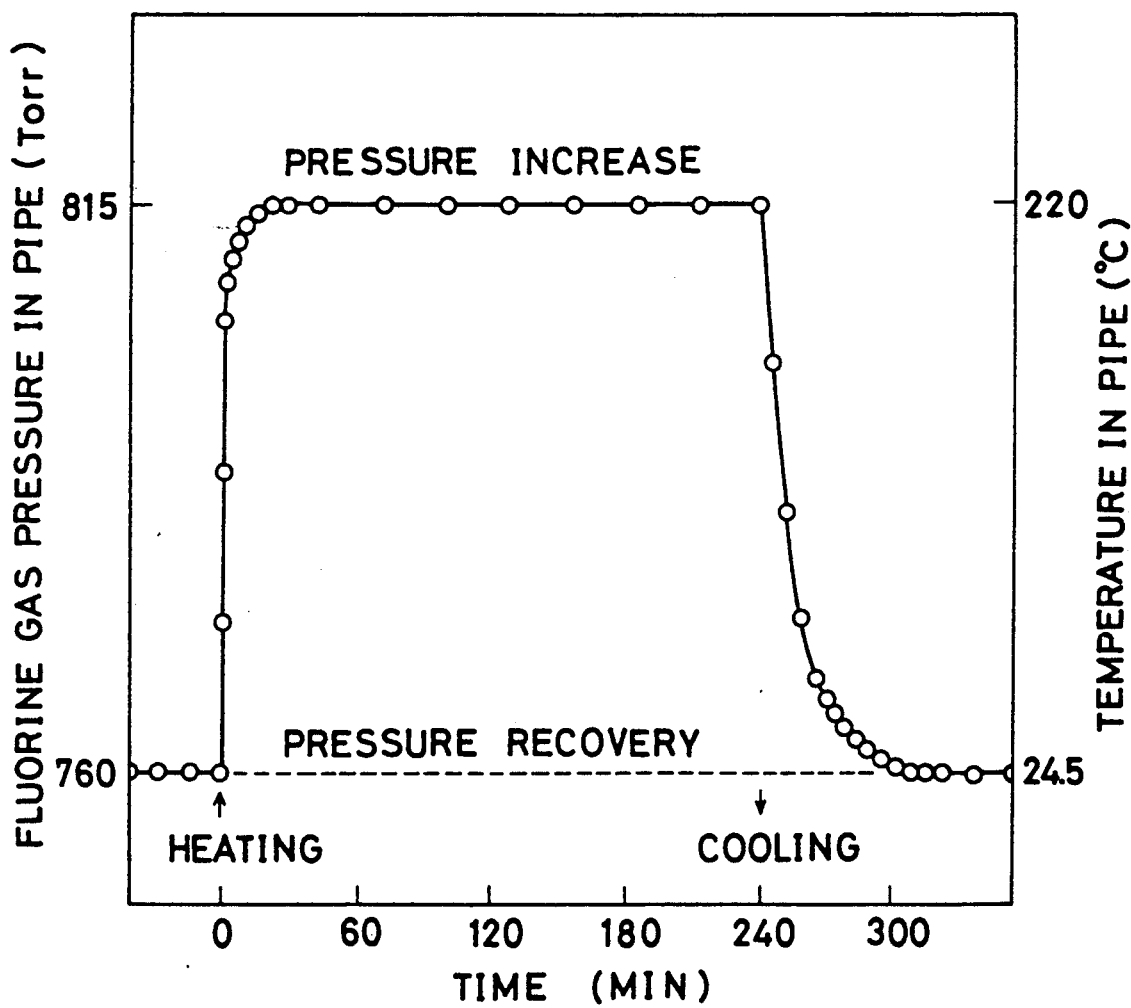
FIG. 22 is a diagram showing barrier effect of the films passivated by fluorination against fluorine gas. As is shown, in the passivated films which were heat-treated, there is no consumption of fluorine at all with respect to fluorine gas of the same temperature as fluorination.

To acknowledge the effect of heat treatment, permeability of fluorine in the passivated films which were heat-treated was checked. In the experiment, an electropolished SUS-316L sample pipe of ¼ inch in diameter and 1 m in length was fluorinated with 100 % F$_2$ gas at 220° C. for 80 minutes, and heat-treated under N$_2$ gas at 320° C. for 24 hours thereby a passivated film being formed. As shown in FIG. 22, fluorine gas was sealed in the pipe on which passivated film was formed at 760 Torr, and heated at the same temperature as the fluorination for 4 hours. Then, consumption of fluorine at the time of heating was checked with reference to the pressure in the pipe when the temperature was returned to that before heating. Variation of pressure in the pipe between the time before heating and the time after heating was not more than 0.5 Torr, i.e., detectable limit by manometer, and no substantial variation was found. In effect, a stable film passivated by fluorination without permeation of fluorine was formed by favorably changing the nonstoichiometric ratio (F$_2$/Fe=5.11) to the stoichiometric ratio (F$_2$/Fe=3.66) by heat treatment and, as a result of this, it was acknowledged that high corrosion resistance to various corrosive gases was achieved by the invention.

What is claimed is:

1. A metal material comprising a metal substrate, and a passivated film formed on at least a portion of the surface of the metal substrate by fluorination of the metal substrate, said film being composed mainly of a metal fluoride in which the proportion of metal to fluorine is substantially in stoichiometric relationship, wherein said metal substrate is baked prior to fluorination in an inert atmosphere and said fluorinated metal substrate is heat-treated to form said stoichiometric relationship.

2. A metal material according to claim 1, wherein said passivated film is formed on a surface of the metal which is polished like a mirror.

3. A metal material according to claim 1, wherein said metal is one of stainless steel, nickel, nickel alloy, aluminum, aluminum alloy, copper, copper alloy and chromium.

4. A metal material according to claim 1, wherein a metal film of one of nickel, nickel alloy, aluminum, aluminum alloy, copper, copper alloy and chromium is formed on a substrate whose base material is said metal material.

5. A gas treating apparatus characterized in that at least one of said metal materials according to any one of claims 1, 2, 3 and 4 is used as a part forming said apparatus.

6. An apparatus according to claim 5 which is used in storage, distribution or reaction of gas.

* * * * *